United States Patent Office

3,168,561
Patented Feb. 2, 1965

3,168,561
N-ALKOXY 2-ALKYL-4-CHLOROPHENOXYACET-
AMIDES FOR THE CONTROL OF PESTS
Sidney B. Richter, Chicago, Ill., assignor to Velsicol
Chemical Corporation, Chicago, Ill., a corporation of
Illinois
No Drawing. Filed Nov. 20, 1962, Ser. No. 239,070
10 Claims. (Cl. 260—559)

This invention relates to the control of undesirable pests. More specifically, this invention relates to the pre-emergence control of undesirable plant life, particularly crabgrass.

It has now been found that undesirable plant life can be controlled very effectively with the use of chemical compounds which are N-monoalkoxy amides of 2-alkyl-4-chlorophenoxy alkyl acids. These new chemical compounds have the structural formula

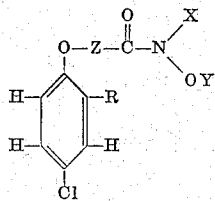

wherein R is an unsubstituted alkyl group containing from one to two carbon atoms, X is selected from the group consisting of hydrogen, and substituted and unsubstituted alkyl groups, Y is selected from the group consisting of substituted and unsubstituted alkyl groups, and Z is an unsubstituted alkylene group containing from one to four carbon atoms. In a preferred embodiment of this invention, R and Z are as described above, X is selected from the group consisting of hydrogen and unsubstituted alkyl groups containing from one to ten carbon atoms, and Y is an unsubstituted alkyl group containing from one to ten carbon atoms.

The novel alkoxy amides of the present invention can be prepared conveniently from the corresponding acid, which is often commercially available, or can be synthesized by treating the corresponding 2-alkyl-4-chlorophenol with an alkali metal hydroxide to form the salt, and treating the salt with a bromo-alkyl acid of the formula Br—Z—COOH wherein Z is as described above, or a lower alkyl ester of the acid, and then hydrolyzing. Alternatively, free acids, other than 2-alkyl-4-chlorophenoxy-acetic acids, can be prepared from the corresponding 2-alkyl-4-chlorophenoxyalkyl acid wherein Z has one less $CH_2$ group attached to the COOH group than in the desired free acid, by reducing the lower acid with lithium aluminum hydride at a low temperature, treating the resulting alcohol with thionyl chloride to obtain the halide, treating the halide with sodium cyanide and then hydrolyzing the product to obtain the free acid.

Examples of the free acids from which the compounds of the present invention can be prepared, are: 2-methyl-4-chlorophenoxy acetic acid, α-(2-methyl-4-chlorophenoxy) propionic acid, β-(2-methyl-4-chlorophenoxy) propionic acid, α-(2-methyl-4-chlorophenoxy)-n-butyric acid, β - (2 - methyl - 4 - chlorophenoxy) - n- butyric acid, γ- (2-methyl-4-chlorophenoxy)-n-butyric acid, α-(2-methyl-4 - chlorophenoxy) - iso - butyric acid, α - (2 - methyl-4-chlorophenoxy)-n-valeric acid, γ - (2 - methyl-4-chlorophenoxy-n-valeric acid, δ-(2-methyl-4-chlorophenoxy)-n-valeric acid, 2-ethyl-4-chlorophenoxy acetic acid, α-(2-ethyl-4-chlorophenoxy) propionic acid, β-(2-ethyl-4-chlorophenoxy) propionic acid, α-(2-ethyl-4-chlorophenoxy)-n-butyric acid, δ-(2-ethyl-4-chlorophenoxy)-n-valeric acid, and the like.

The free acid can then be converted to its acid chloride, which is treated with an alkoxyamine of the formula

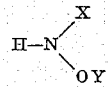

wherein X and Y are as described above, to give the desired compound of the present invention. Suitable amines of the above formula can be prepared, for example, by the reduction of the corresponding oximes as described by Jones and Major, J. Am. Chem. Soc., vol. 52, pp. 669–79 (1930). Exemplary of suitable alkoxy amines useful as a reactant to prepare the N-alkoxy amides of the present invention, are: N-methoxyamine, N-methoxy-N-methylamine, N-ethoxyamine, N-ethoxy, N-methylamine, N-ethoxy-N-ethylamine, N-methoxy-N-ethylamine, N-n-propoxyamine, N-iso-propoxyamine, N-n-propoxy-N-ethylamine, and the like.

More particularly, the free acid is treated with an equimolecular or greater quantity of thionyl chloride, preferably in a solvent or diluent, such as benzene. An amount of solvent or diluent approximately equal in volume to the volume of the free acid has been found to be satisfactory. The treatment is performed by heating for several hours, preferably at reflux if a solvent or diluent, such as benzene, or large excess of thionyl chloride is used. The corresponding acyl chloride thus formed can be isolated from the reaction mixture by means common to the art, such as by distillation of the solvent or diluent and unreacted reactants, leaving the acyl chloride as the residue.

In the second step, the acyl chloride is reacted with an equimolecular or greater amount of the appropriate N-alkoxyamine or preferably its hydrochloride, in the presence of a base, such as sodium hydroxide, potassium hydroxide, and potassium carbonate. At least one equivalent quantity of base, is used when the free amine is utilized as the reactant, and at least twice that amount is used when the amine hydrochloride is used as the reactant. The base is used to release the amine from its hydrochloride, and to neutralize the hydrogen chloride, formed during the reaction. A small amount of water is preferably added to the reaction mixture to form an aqueous solution of the base to aid in mixing the base into the solution of the amine or amine-hydrochloride reactant. The reaction is conveniently performed utilizing a solvent or diluent, such as benzene, by heating for several hours preferably at reflux temperature when a solvent or diluent is used. When potassium carbonate is used as the base, completion of the reaction can be readily detected by the cessation of the release of carbon dioxide gas. The N-alkoxy amide compound of the present invention formed by the above procedure can be separated from the reaction mixture by means common to the art, such as by filtration from precipitated salts and unreacted amine, drying the filtrate and distilling the filtrate under reduced pressure to remove unreacted reactants and solvent or diluent, if used, and to recover the desired product as the residue. The N-alkoxy amide compound of the present invention thus obtained can be used for many applications as such, or can be recrystallized from a suitable solvent.

The manner in which the new compounds of this invention can be prepared is illustrated in the following examples.

EXAMPLE 1

*Preparation of 2-methyl-4-chlorophenoxyacetyl chloride*

2-methyl-4-chlorophenoxyacetic acid (110.3 g.; 0.55 mol) and benzene (110 ml.) were placed into a one-liter, three-necked, round-bottom flask fitted with a mechanical stirrer, reflux condenser, and a dropping funnel. The contents of the flask were stirred and thionyl chloride (44 ml.; 0.61 mol) was slowly added to the flask. The contents were heated to reflux, and stirring was continued at reflux for six hours. The reaction mixture was dried over magnesium sulfate, filtered and distilled under reduced pressure to remove benzene and unreacted thionyl chloride. The residue was distilled in vacuo to yield the product 2-methyl-4-chlorophenoxyacetylchloride, as a clear yellow liquid.

EXAMPLE 2

*Preparation of N-methoxy-N-methyl-2-methyl-4-chlorophenoxyacetamide*

N-methoxy - N - methylamine - hydrochloride (8 g.; 0.082 mol), potassium carbonate (12.4 g.; 0.09 mol), benzene (80 ml.) and water (10 ml.) were placed in a 300-ml., three-necked, round-bottom flask, equipped with a mechanical stirrer, reflux condenser, and dropping funnel. The mixture was stirred, and 2-methyl-4-chlorophenoxyacetyl chloride (18 g.; 0.082 mol), prepared in Example 1, was slowly added to the flask. The addition was exothermic, and the mixture was thereafter stirred at reflux for 6½ hours. The reaction mixture was filtered and the solids washed thrice with benzene. The benzene washings were combined with the filtrate, dried over magnesium sulfate, filtered, and the filtrate distilled under reduced pressure to remove benzene and to yield a white solid residue. This residue was recrystallized from heptane to give the product N-methoxy-N-methyl-2-methyl-4-chlorophenoxyacetamide melting 84–7° C., and having the following elemental analysis:

Calculated for $C_{11}H_{14}ClNO_3$:

|  | C | H | Cl | N |
| --- | --- | --- | --- | --- |
| Theoretical, percent | 54.21 | 5.75 | 14.58 | 5.75 |
| Found, percent | 53.38 | 5.89 | 14.60 | 5.65 |

EXAMPLE 3

*Preparation of N-methoxy-2-methyl-4-chlorophenoxyacetamide*

Methoxyamine-hydrochloride (7.4 g.; 0.088 mol), potassium carbonate (13.4 g.; 0.097 mol), benzene (50 ml.) and water (10 ml.) were placed in a 300 ml. three-necked, round-bottom flask fitted with a mechanical stirrer, reflux condenser and dropping funnel. The mixture was stirred, and 2-methyl-4-chlorophenoxyacetyl chloride (19.3 g.; 0.088 mol), prepared in Example 1, was slowly added to the flask. The addition was exothermic, and the mixture was thereafter stirred at reflux for 6½ hours. The reaction mixture was filtered and the solids washed three times with benzene. The benzene washings were combined with the filtrate, and the mixture was dried over magnesium sulfate, filtered, and the filtrate therefrom distilled under reduced pressure to remove benzene to yield a white solid residue which was recrystallized from heptane and dried to yield white solid N-methoxy-2-methyl-4-chlorophenoxyacetamide, melting 92–94.5° C. and having the following elemental analysis:

Calculated for $C_{10}H_{12}ClNO_3$:

|  | C | H | Cl | N |
| --- | --- | --- | --- | --- |
| Theoretical, percent | 52.29 | 5.23 | 15.47 | 6.10 |
| Found, percent | 52.27 | 5.88 | 15.46 | 5.55 |

EXAMPLE 4

*Preparation of N-ethoxy-2-methyl-4-chlorophenoxyacetamide*

The product of Example 1 is reacted with ethoxyamine hydrochloride according to the technique of Example 3 to yield N-ethoxy-2-methyl-4-chlorophenoxyacetamide.

EXAMPLE 5

*Preparation of N-n-propoxy-N-methyl-α(2-methyl-4-chlorophenoxy)-propionamide*

α-(2-methyl-4-chlorophenoxy)-propionic acid, which can be prepared by treating 2-methyl-4-chlorophenol with sodium hydroxide and then α-bromopropionic acid, is treated with thionyl chloride by the procedure of Example 1 to obtain α-(2-methyl-4-chlorophenoxy)-propionyl chloride. This latter intermediate is reacted with N-n-propoxy-N-methylamine hydrochloride by the technique of Example 2 to yield the desired product N-n-propoxy-N-methyl-α-(2-methyl-4-chlorophenoxy)-propionamide.

EXAMPLE 6

*Preparation of N-methoxy-γ-(2-ethyl-4-chlorophenoxy)-n-butyramide*

γ-(2-ethyl-4-chlorophenoxy)-n-butyric acid, which can be prepared by treating 2-ethyl-4-chlorophenol with sodium hydroxide and then γ-bromo-n-butyric acid, is treated with thionyl chloride by the procedure of Example 1 to obtain γ-(2-ethyl-4-chlorophenoxy)-n-butryl chloride. This intermediate is reacted with methoxyaminehydrochloride according to the technique of Example 3 to yield the desired product N-methoxy-γ-(2-ethyl-4-chlorophenoxy)-n-butyramide.

EXAMPLE 7

*Preparation of N-ethoxy-N-ethyl-δ-(-2-ethyl-4-chlorophenoxy)-n-valeramide*

δ-(2-ethyl-4-chlorophenoxy)-n-valeric acid, which can be prepared by treatng 2-ethyl-4-chlorophenol with sodium hydroxide, and then δ-bromo-n-valeric acid, is treated with thionyl chloride by the method of Example 1 to obtain δ-(2-ethyl-4-chlorophenoxy)-n-valeryl chloride. This intermediate is reacted with N-ethoxy-N-ethylamine-hydrochloride according to the procedure of Example 2 to yield the desired product N-ethoxy-N-ethyl-δ-(-2-ethyl-4-chlorophenoxy)-n-valeramide.

Other compounds within the scope of the present invention can be prepared in the manner detailed in the previous examples. Given in Examples 8–18 are the free acid and the amine reactants which can be used to prepare the indicated named compounds of this invention.

EXAMPLE 8

β-(2-methyl - 4 - chlorophenoxy) - n - butyric acid+N-methoxy-N-n-butylamine=N-methoxy-N-n-butyl - β - (2-methyl-4-chlorophenoxy)-n-butyramide.

EXAMPLE 9

α-(2-methyl-4-chlorophenoxy)-iso-butyric acid+N-ethoxy-N-n-propylamine=N-ethoxy-N-n-propyl-α-(2-methyl-4-chlorophenoxy)-iso-butyramide.

EXAMPLE 10

β-(2-ethyl-4-chlorophenoxy)-n-propionic acid+N-methoxy-N-methylamine=N-methoxy-N-methyl-β-(2-ethyl-4-chlorophenoxy)-n-propionamide.

EXAMPLE 11

2-ethyl-4-chlorophenoxyacetic acid+n-butoxyamine=N-n-butoxy-2-ethyl-4-chloro-phenoxyacetamide.

EXAMPLE 12

γ-(2-ethyl-4-chlorophenoxy)-n-valeric acid+n-methoxy-N-methylamine=N-methoxy-N-methyl-γ-(2-ethyl-4-chlorophenoxy)-n-valeramide.

EXAMPLE 13

2-ethyl-4-chlorophenoxyacetic acid+N-methoxyamine=N-methoxy-2-ethyl-4-chlorophenoxyacetamide.

EXAMPLE 14

2-ethyl-4-chlorophenoxyacetic acid+N-methoxy-N-methylamine=N-methoxy-N-methyl-2-ethyl-4-chlorophenoxyacetamide.

EXAMPLE 15

α-(2-methyl-4-chlorophenoxy) propionic acid+N-methoxy-N-methylamine=N-methoxy-N-methyl-α-(2-methyl-4-chlorophenoxy)-propionamide.

EXAMPLE 16

α-(2-methyl-4-chlorophenoxy)-n-butyric acid+N-methoxy-N-methylamine=N-methoxy-N-methyl-α-(2-methyl-4-chlorophenoxy) n-butyramide.

EXAMPLE 17

β-(2-methyl-4-chlorophenoxy)-propionic acid+N-methoxy-N-methylamine=N-methoxy-N-methyl-β-(2-methyl-4-chlorophenoxy)-propionamide.

EXAMPLE 18

α-(2-methyl-4-chlorophenoxy)-iso-butyric acid+N-methoxy-N-methylamine=N-methoxy-N-methyl-α-(2-methyl-4-chlorophenoxy)-iso-butyramide.

For practical use as pre-emergence herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the soil to be treated in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the soil to be treated. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 19

Preparation of a dust

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The pre-emergence herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambs-quarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quack-grass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises applying to the soil containing weed seeds and seedlings, a herbicidal composition comprising an inert carrier and as the essential active ingredient, in a quantity which is herbicidally toxic to said weed seeds and/or seedlings, a compound of this invention. Application of the herbicidal composition is preferably made to the soil at or before the time of planting or between planting and the emergence of desirable plants. Where the soil is to be treated between planting and emergence of desirable plants, it is preferred to plant the seeds of desirable plants below the zone of the weed seeds. The exact amount of compound required will depend on a variety of factors, including the hardiness of the particular weed species, weather, method of application, the kind of beneficial plant seeds in the same area, and the like. Thus, while the application of up to only about one or two ounces of an active compound per acre may be sufficient for good control of a light infestation of weeds under adverse conditions, the application of one pound or more of active compound per acre may be required for good control of a dense infestation of hardy weed seeds under favorable conditions.

The herbicidal toxicity of the new compounds of this invention can be illustrated by many of the established pre-emergence testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of pre-emergence herbicidal activity of the compounds of this invention. Comparable pre-planting tests can also be used.

The herbicidal activity of the compounds of the present invention was illustrated, for example, by a number of experiments carried out for the pre-emergence control of crabgrass. Crabgrass is a term used to describe a group of summer annuals which cause extensive damage to lawns, turf, and other grassy areas. The crabgrass kills by taking moisture and nutrients from the soil and thus smothering and choking the desirable grasses. The grasses around each crabgrass plant are usually killed or seriously weakened. When the crabgrass dies, it leaves bare spots, liberally sprinkled with enough seeds to provide serious infestation the next season. The two species of carbgrass which are the most widespread weed pests of lawns are *Digitaria ischaemum,* commonly known as smooth crabgrass, and *Digitaria sanguinalis,* usually known as common, large, hairy, tall, purple, fingergrass, turkeyfoot, crowfoot grass, and watergrass. At least fifteen other varieties of Digitaria species of crabgrass are known. Also generally classified with crabgrass are such weeds as goosegrass (*Eleusine Indica*), broomsedge (*Andropogon virginicus*), pigeon grass or green bristle grass (*Setaria viridis*), yellow bristle grass (*Setaria lutescens*), watergrass (*Echinochloa crusgalli*), witchgrass (*Punicum capillare*), cheatgrass or chess (*Bromus secalinus*), and downy bromegrass (*Bromus tactorum*).

In one series of tests, filter paper was dipped in acetone solutions of the test compounds at various concentrations. The paper was then dried, and small pieces were placed on the bottom of plastic dishes having a film of agar nutrient and a row of crabgrass seeds set apart from the treated filter paper. The seeds were allowed to germinate under controlled laboratory conditions, and a toxicity of the chemical compounds was determined on the basis of the primary root length of the germinated seedlings, short root lengths being indicative of high toxicity to crabgrass. The results of these tests are summarized in the following table:

| Test Chemical | Primary root lengths in mm. at concns. in p.p.m. of— | | | | | |
|---|---|---|---|---|---|---|
| | 500 | 400 | 300 | 200 | 100 | 50 |
| N-Methyoxy-N-methyl-2-methyl-4-chlorophenoxy-acetamide (Product of Example 2) | 0.76 | 0.73 | 0.85 | 1.1 | 2.9 | 3.8 |
| Untreated Check | | | | 27.4 | | |

In another series of tests, seeds of smooth crabgrass (*Digitaria ischaemum*) and hairy crabgrass (*Digitaria sanguinalis*) were planted in rows in flats of greenhouse soil. After the seeds were planted and covered with soil, the compounds to be tested were sprayed on the soil as aqueous emulsions at a range of concentrations. The soil was then covered with plasterer's grade vermiculite and watered. Growth of the plants was maintained under controlled greenhouse conditions, and plant counts were made approximately 20 days after planting. The results of these tests are summarized in the following table:

| Test Compound | Concentration, lbs./acre | Number of Growing Plants After 20 Days | |
|---|---|---|---|
| | | D. ischaemum | D. sanguinalis |
| N-Methoxy-N-methyl-2-methyl-4-chloro-phenoxyacetamide (Proof Example 2) | 0.5 | 0<br>4<br>2<br>0 | 1<br>2<br>6<br>0 |
| Average | | 1.5 | 2 |
| Do | 1 | 0<br>0<br>1<br>0 | 0<br>0<br>0<br>0 |
| Average | | 0 | 0 |
| Do | 2 | 0<br>0<br>0<br>0 | 0<br>0<br>0<br>0 |
| Average | | 0 | 0 |
| Untreated Check (Control) | | 40<br>32<br>46<br>47<br>48 | 30<br>31<br>19<br>28<br>25 |
| Average | | 43 | 27 |

I claim:
1. A compound of the formula

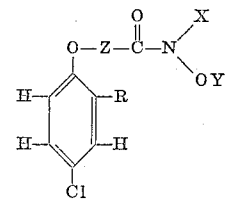

wherein R is unsubstituted lower alkyl, X is selected from the group consisting of hydrogen and alkyl of from one to ten carbon atoms, Y is alkyl of from one to ten carbon atoms, and Z is unsubstituted alkylene of from one to four carbon atoms.

2. N-methoxy-2-methyl-4-chlorophenoxyacetamide.
3. N - methoxy - N - methyl - 2 - methyl - 4 - chlorophenoxyacetamide.
4. N-ethoxy-2-methyl-4-chlorophenoxyacetamide.
5. N-methoxy-2-ethyl-4-chlorophenoxyacetamide.
6. N - methoxy - N - methyl - 2 - ethyl - 4 - chlorophenoxyacetamide.
7. N - methoxy - N - methyl - α - (2 - methyl - 4 - chlorophenoxy)-propionamide.
8. N - methoxy - N - methyl - α - (2 - methyl - 4 - chlorophenoxy)-n-butyramide.
9. N - methoxy - N - methyl - β - (2 - methyl - 4 - chlorophenoxy)-propionamide.

10. N - methoxy - N - methyl - $\alpha$ - (2 - methyl - 4-chlorophenoxy)-iso-butyramide.

References Cited by the Examiner
UNITED STATES PATENTS

| | | | |
|---|---|---|---|
| 2,723,192 | 11/55 | Todd | 71—2.6 |
| 2,726,150 | 12/55 | Wolter | 71—2.6 |
| 2,832,767 | 4/58 | Boettner | 260—559 XR |
| 2,911,440 | 11/59 | Thullier et al. | 260—559 |
| 2,948,754 | 8/60 | Litvan et al. | 260—559 |
| 3,027,407 | 3/62 | Major et al. | 260—559 |
| 3,029,277 | 4/62 | Metivier | 260—559 XR |

OTHER REFERENCES
Alkiewicz et al.: Nature, vol. 180, pages 1204–5 (1957).

Chemical Abstracts Fifth Decennial Index Subjects Po–Rz, vols 41–50 (1947–56) pages 10285S–6S (1962).

Eckstein et al.: Chemical Abstracts, vol. 52, pages 16,616, 16,617 (1958).

WALTER A. MODANCE, *Primary Examiner.*

DUVAL T. McCUTCHEN, NICHOLAS S. RIZZO, *Examiners.*

UNITED STATES PATENT OFFICE
CERTIFICATE OF CORRECTION

Patent No. 3,168,561                            February 2, 1965

Sidney B. Richter

It is hereby certified that error appears in the above numbered patent requiring correction and that the said Letters Patent should read as corrected below.

Column 3, in the table, second column, line 2 thereof, for "53.38" read -- 54.38 --; column 5, line 18, for "acid+n-" read -- acid+N- --; column 7, line 52, for "tactorum", in italics, read -- tectorum --, in italics.

Signed and sealed this 20th day of July 1965.

(SEAL)
Attest:

ERNEST W. SWIDER                                    EDWARD J. BRENNER
Attesting Officer                                         Commissioner of Patents